Dec. 27, 1960 V. A. VON HAASE 2,965,926
EXTRUSION MACHINES
Filed Feb. 13, 1959 2 Sheets-Sheet 1
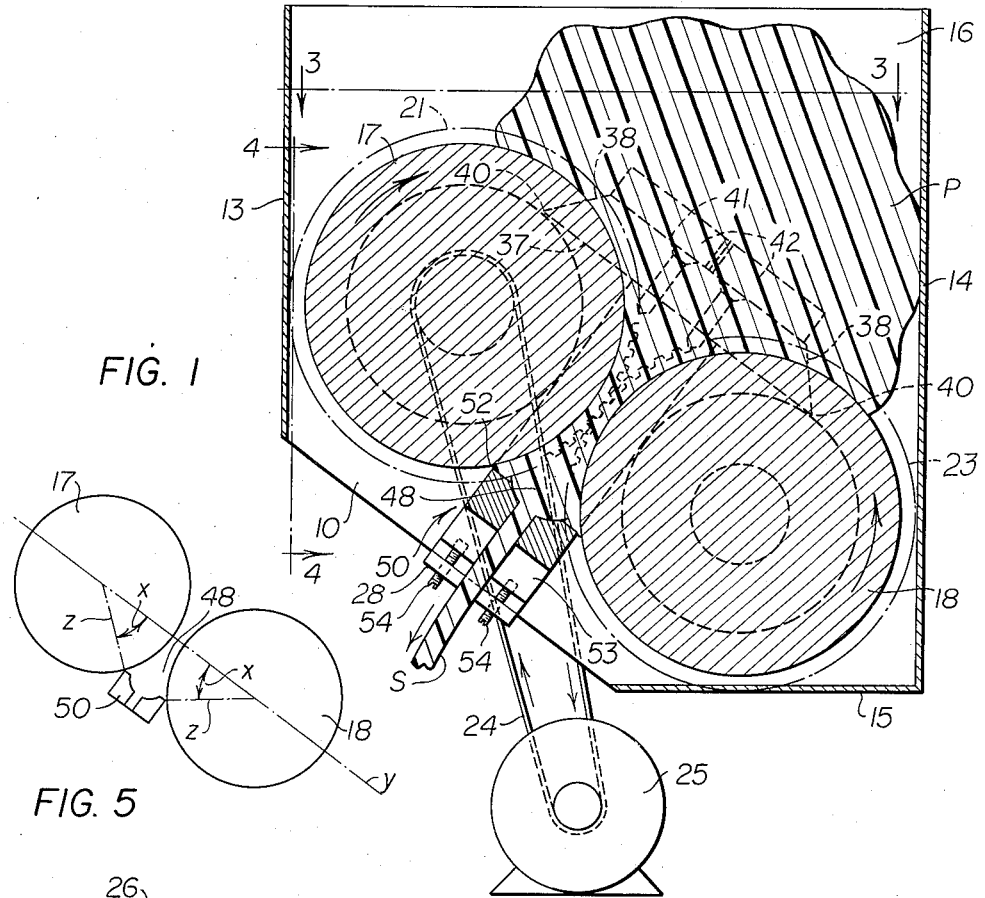
FIG. 1
FIG. 5
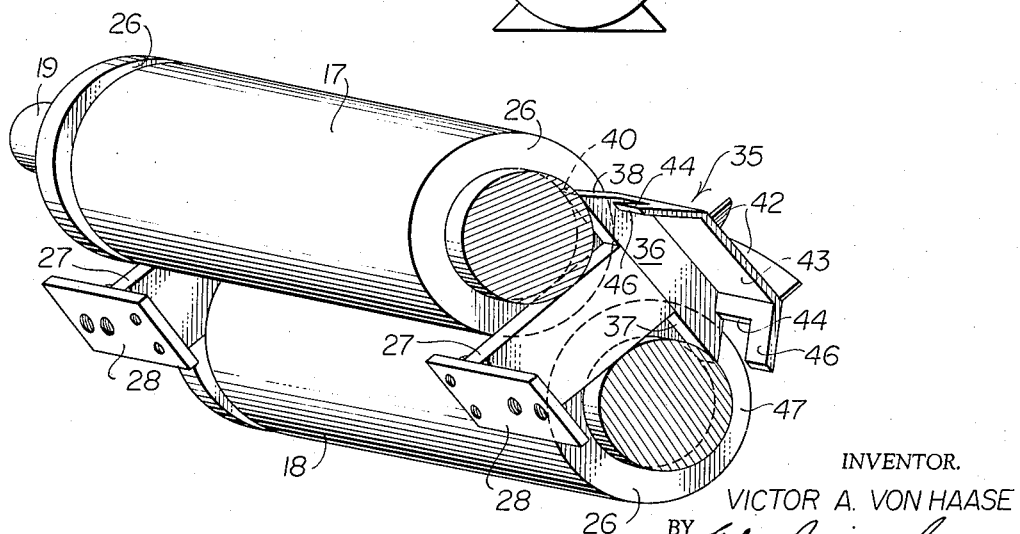
FIG. 2
INVENTOR.
VICTOR A. VON HAASE
BY
ATTORNEYS Dec. 27, 1960 V. A. VON HAASE 2,965,926
EXTRUSION MACHINES
Filed Feb. 13, 1959 2 Sheets-Sheet 2

INVENTOR.
VICTOR A. VON HAASE
BY
ATTORNEYS

United States Patent Office 2,965,926
Patented Dec. 27, 1960

2,965,926
EXTRUSION MACHINES

Victor A. von Haase, Rocky River, Ohio, assignor to Von Machine & Mfg., Inc., Rocky River, Ohio, a corporation of Ohio Filed Feb. 13, 1959, Ser. No. 793,044

5 Claims. (Cl. 18—12)

This invention relates to machines for extruding plastic materials and, particularly, to machines for extruding caulking and glazing compounds into strips, strings, or ropes, or for feeding such materials into packages or the like. However, the machines of the invention are also adapted for extruding a wide variety of other materials of a plastic, mastic, or dough-like character into bodies of a fixed cross section and any desired length.

The invention is of especial value for extruding materials of a stiffly plastic character having a fibrous filler incorporated therein, which are adversely affected by excessive kneading, working, and subdivision of the material in the course of forcing it toward and through an extrusion die. The invention is also of especial value for extruding stiffly plastic materials which would be deleteriously affected by excessive heating caused by working of the material during its extrusion.

The objects of the invention are to simplify and reduce the cost of extruding machines for the types of operations described above; to reduce the power required to operate such machines and the severity of the working of the plastic material during the extrusion operation, whereby less heat is developed in the extrusion material, cooling of the extrusion apparatus is unnecessary, and destruction of fibrous fillers in the extrusion materials is minimized; to reduce the maintenance requirements of the extrusion apparatus; to render the extrusion apparatus more flexible in its adaptability for handling different extrusion materials, feed rates, etc.; to provide means for preventing the extrusion material from working its way into bearings of the extrusion machine; and to simplify the mounting and adjustment of extrusion dies. Various other more specific objects of the invention will become apparent from the following description of the invention.

Heretofore, most extrusion machines for forcing stiffly plastic material through dies have employed auger-type feed mechanisms for feeding the plastic material to the extrusion dies under the relatively high pressure required. Auger-type feeding mechanisms are objectionable because they severely knead, work, and subdivide the plastic material while forcing it to the extrusion die. This not only causes deterioration of fibrous materials incorporated in the plastic extrusion material, but it also creates a substantial amount of heat, often requiring that the auger-type feeding mechanism be water-cooled to dissipate this heat. A feature of the persent invention is the elimination of auger-type feeding mechanisms and the substitution of a roller-type feed which greatly reduces the kneading, working, and subdividing of the extrusion material and eliminates any need for cooling of the extrusion apparatus. While roller type feeding mechanisms are broadly old for similar purposes, the feeding mechanisms of this type have not been satisfactory for feeding stiffly plastic materials which are highly resistant to plastic flow. According to the present invention, this problem is solved by the arrangement of the extrusion die and the feed rollers as hereinafter described. This results in a substantial reduction in the size and cost of the machines, the power required to operate them, and the maintenance required thereby. Another feature of the invention is that the die employed in cooperation with a pair of feed rollers may be floatingly mounted relative to the rollers with a simple adjusting mechanism to vary the spacing of the die from the rollers as required by differences in the consistency of the extrusion material being handled in the machine and the pressures required to force it through the die. Still another feature of the invention is the provision of simple and reliable means for confining the extrusion material in the desired portion of the machine away from all bearings which may be adversely affected by the entrance of the extrusion material between relatively moving bearing surfaces.

The foregoing and still other objects, features, and advantages of the invention will be more fully understood from the following detailed description of a preferred embodiment of the invention, taken in connection with the accompanying drawings in which:

Figure 1 is a vertical sectional view of an extrusion machine embodying the invention, the plane of the section being through the extrusion rollers and associated die and normal to the axes of the extrusion rollers;

Fig. 2 is a perspective view of the extrusion rollers and certain associated structure for confining the extrusion material in the desired zones, various other parts of the machine being omitted;

Fig. 5 is a diagrammatic end view of the extrusion rollers and the associated die and illustrates a critical relationship in the arrangement thereof for accomplishing the objects of the invention.

Figure 3:
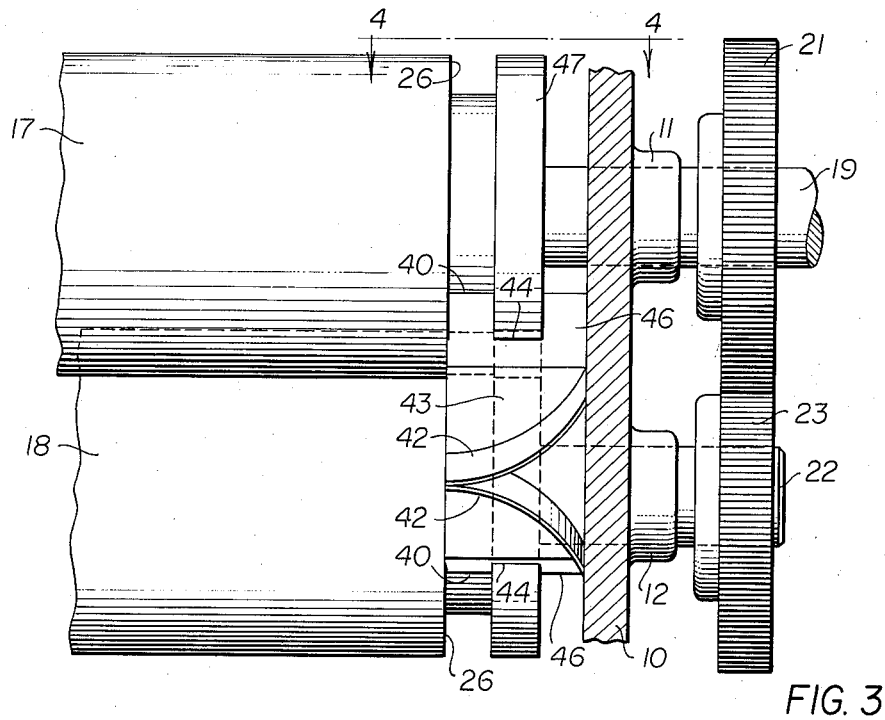
Fig. 3 is a fragmentary plan view of the mechanism shown in Fig. 1, shown partly in section as indicated by the line 3—3 in Fig. 1.
Figure 4:
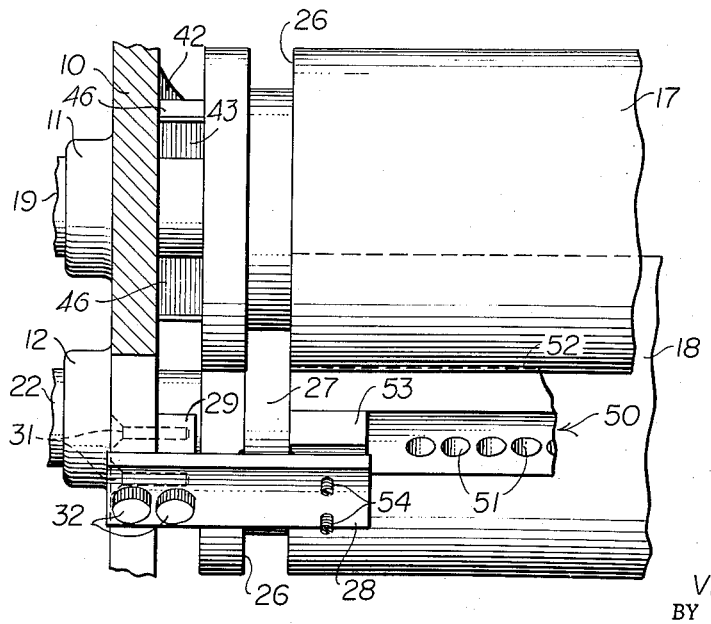
Fig. 4 is a fragmentary elevational view of the mechanism of Figs. 1 and 3, taken as indicated by the lines 4—4 in both Fig. 1 and Fig. 3.

Referring to the drawings, the machine illustrated therein may be constructed on any suitably rigid framework comprising a pair of spaced, parallel, frame plates 10 (only one being shown), between which the feed rollers of the machine are mounted in suitable bearings 11 and 12 carried by the frame plates 10 (Figs. 3 and 4). End plates 13 and 14 and a bottom plate 15 may bridge the space between the frame plates 10 to define a compartment 16 for housing the feed rollers and die assembly hereinafter described.

The pair of feed rollers 17 and 18 may be identical except that the integral shaft 19 of the feed roller 17 may extend outwardly through the bearing 11 far enough to receive a gear 21 and a suitable driving sprocket (not shown) disposed outwardly beyond the gear 21. The shaft 22 of the other feed roller 18 may extend outwardly beyond its bearing 12 in one of the frame members only far enough to receive a pinion 23 driven by the gear 21. As indicated in Fig. 1, the driving sprocket on the feed roller shaft 19 may be coupled by a chain 24 to a suitable motor 25 or other source of power. As will be apparent, the motor 25, driving the chain 24 in the direction shown by arrows in Fig. 1, will turn the feed roller 17 clockwise as shown in that figure and will turn the feed roller 18 in the reverse direction (also shown by arrows in Fig. 1) by virtue of the interconnection of the two rollers through the gear 21 and pinion 23. The gear 21 and pinion 23 may be the same size so that the two feed rollers turn at the same speed.

A mass of plastic material P to be extruded may be placed in the compartment 16 against the feed rollers 17 and 18 on the side thereof which is hereinafter referred to as the low pressure side, whereby the extrusion material P will be fed between the rollers to the opposite or high pressure side thereof as indicated in Fig. 1.

Each feed roller 17 and 18 comprises a main elongated body portion of uniform diameter except for a peripheral groove 26 cut adjacent each end thereof. Extrusion material acted upon by the body portions of the rollers between end grooves 26 will tend to work axially outwardly in both directions toward and into these grooves. Such outward working of the extrusion material beyond the grooves 26 is prevented in part by a pair of wall members 27, one being mounted adjacent each end of the pair of feed rollers and supported by brackets 28 secured to the respective frame plates 10. As best shown in Fig. 4, a block 29 may be secured to the inner side of each frame plate 10 by a pair of screws 31 to provide a thickened region of the frame plate to which a bracket 28 may be secured by another pair of screws 32.

Each wall member 27 may be a relatively small, elongated, rectangular plate disposed as shown in Fig. 2 and dimensioned to extend laterally into aligned grooves 26 at the adjacent ends of both feed rollers 17 and 18 with close sliding contact against the bottom and both side walls of the aligned roller grooves 26. On the low pressure side of the feed rollers, each wall member 27 may have a scraper device, generally designated 35, attached thereto for scraping plastic material from the rollers as the material works into and beyond the aligned grooves 26. The scraper device may include a block 36 welded to or formed integrally with the wall member 27, the block 36 having the general form in profile of a symmetrical trapezoid as best shown in dotted outline in Fig. 1, and being of the same thickness as the wall member 27 and disposed in alignment therewith to provide close sliding contact with the bottoms and both side walls of two aligned grooves 26. The longest edge 37 of the block 36 extends in opposite directions from the wall member 27 into the aligned grooves 26 and substantially tangent to the bottoms of the grooves. The short non-parallel edges 38 of the block 36 intersect the long edge 37 thereof at an acute angle to provide sharp transverse edges 40 disposed against the bottoms of the grooves 26 in which they are located. As will be apparent from the direction of rotation of the feed rollers 17 and 18, the sharp edges 40 will scrape plastic material from bottoms of the aligned grooves 26, and the nonparallel edges 38 of the block 36 will scrape plastic material from the inner side walls of the grooves 26. Plastic material so scraped from the grooves 26 will be forced outwardly from the grooves along the edges 38 of the scraper block 36 and along the outer edge 41 thereof until deflected by curved deflector blades 42 as hereinafter described.

The scraper device 35 also includes a transversely extending plate 43 welded to or formed integrally with the block 36. The plate 43 may be symmetrically shaped as best shown in Figs. 2 and 3 to provide a second pair of scraper edges 44 engaging the peripheries of the rollers 17 and 18 outwardly beyond the aligned grooves 26 therein, and also to provide a pair of fingers 46. The inner edges of the fingers 46 engage the outer ends 47 of the rollers 17 and 18 with a close sliding fit, and the outer edges of both fingers 46 and of the transverse scraper plate 43 abut against the frame plates 10. The pair of scraper edges 44 and the pair of fingers 46 function to scrape from the outer end portions of the rollers any plastic material that may work its way past the aligned grooves 26. Such additional plastic material scraped from the rollers by the plate 43 will also be fed toward and into engagement with the deflector blades 42. As best shown in Figs. 2 and 3, the deflector blades 42 are curved to deflect inwardly toward the center of the machine any plastic material forced into engagement therewith by the scraper mechanism. As shown, each pair of deflector blades may be arranged in a generally V-shaped configuration and be welded to or formed integrally with the transverse scraper plate 43.

Plastic material fed between the rollers 17 and 18 to the high pressure side thereof accumulates in a high pressure feeding zone 48 adjacent a die block 50 having, for example, a plurality of round openings 51 extending therethrough for defining the cross-sectional shape of strips of extrusion material forced therethrough, one such strip S being indicated in Fig. 1. Obviously, the holes 51 may be of any desired form to provide extrusions of different cross-sectional configurations.

The die block 50 may itself have any of a variety of configurations so long as it provides a pair of parallel longitudinal edges 52 disposed closely adjacent the feed rollers 17 and 18 over the entire lengths thereof between the wall members 27. As will be apparent from the drawings, the high pressure feeding zone 48 referred to above is substantially completely enclosed by the die block 50, the wall members 27, and the feed rollers 17 and 18, except for the space between the rollers through which the plastic material is fed, the openings 51 in the die block, and the very small spaces between the die block edges 52 and the rollers 17 and 18, respectively. These very small spaces are adjustable, as hereinafter described, to permit a thin layer of the plastic material to be extruded therethrough. The thickness of this layer of plastic material is controlled by adjusting these small spaces so that the desired pressure of plastic material in the high pressure feeding zone 48 will be maintained, and the thin layer of pastic material will, in effect, be calendered onto and will adhere to the rollers 17 and 18 as a substantially continuous coating over the surfaces thereof.

Referring now to Fig. 5, the plane containing the parallel axes of the rollers 17 and 18 is indicated by the reference line $y$. The high pressure feeding zone 48 may be considered as being bounded at its mouth or throat by this plane and on its opposite end by the inner exposed surface of the die block 50. Opposite sides of the zone 48 are defined by portions of the surfaces of the two rollers between the plane indicated by the line $y$ and the inner exposed surface of the die block. The central angles of the cylindrical rollers subtended by these surface portions of the rollers are designated $x$. The smaller the width of the die 50, the further the die will move inwardly between the rollers 17 and 18 and the smaller are the angles $x$. Reduction of the width of the die, and corresponding reduction of the angles $x$, both narrows and shortens the high pressure zone 48. This causes the high pressure zone to more closely confine the plastic material therein and to make it flow more nearly linearly toward the die openings through which it is extruded. The result is a surprisingly great reduction in the resistance of the plastic material to extrusion, in the power required to drive the rollers, and in the required size and strength of the roller shafts 19 and 20 and associated driving parts. Much less working and kneading of the plastic material is produced by this more nearly linear flow of the plastic material, which is one of the important objectives of the invention, both to avoid deterioration of the plastic material and to produce less heat so that water cooling or the like can be dispensed with. Also, the substantial reduction in the size and massiveness of the roller shafts and drive mechanism therefor, and in the power required to drive the machine, permits a much smaller motor to be used and reduces the power required to operate the machine.

No absolute limits can be placed on the angles $x$ for accomplishing the various objects of the invention. How small these angles may be is limited by the required die width to provide the desired size of the die openings while still providing a sufficiently strong and rigid die, and also by the practical maximum diameter of the rollers 17 and 18. However, I have found by experience that the angles $x$ should not be greater than about 45° and are preferably 40° or less. Above 40° to 45° for the angles $x$, the working of the plastic material increases very rapidly because the width of the high pressure zone increases very rapidly, i.e., with the sine of the angles $x$. As practical limits of the invention, therefore, the maximum value for the angles $x$ may be taken as 45°, and is preferably 40° or less.

As best shown in Figs. 1 and 4, the die block 50 may be floatingly and adjustably held in position at each end thereof by a spacer block 53 disposed between the die block and the adjacent bracket 28, and by a pair of set screws 54 which are threaded through the bracket 28 and project into shallow sockets in the spacer block 53. This arrangement of parts may be assembled by simply slipping the die block into position against the rollers 17 and 18 and holding it in this position while slipping the spacer blocks 53 into place against each end of the die block. The set screws 54 may then be tightened so that they project into their respective sockets in the spacer block and bear against the bottoms of these sockets to urge the spacer block against the die block. Because the set screws 54 project into sockets in the spacer block, the spacer block cannot slide out of place, and there is insufficient room for the die blocks to fall out of place before extrusion begins even though it is not held tightly against the rollers 17 and 18.

When the machine is put in operation to force plastic material between the rollers and into the high pressure feeding zone 48 against the die block, the set screws 54 are readjusted as required by the consistency of the plastic material so that only a thin layer of this plastic material is calendered by the die block edges 52 onto the surfaces of the rollers 17 and 18, as described above. The bulk of the plastic material so fed into the high pressure feeding zone 48 is forced through the openings 51 in the die block in the form of continuous ropes or strings of the plastic material. The pressure of this material against the die block holds it against the spacer blocks 53, and, within limits, the die block is capable of sliding on the spaced blocks to center itself relative to the space between the feed rollers. Thus, the die block is actually floatingly supported by the plastic material during operation of the machine.

The ropes or strings of plastic material extruded through the openings 51 in the die block 50 may be handled in any desired manner by associated equipment old in the art. For example, they may be fed together with a strip of waxed paper from an associated reel onto a receiving roller or spool (not shown) for coiling the plastic rope or string on the spool with the waxed paper separating successive convolutions of plastic material. Alternatively, the plastic material emerging from the die may be fed into a package of any desired type to be filled therewith, such as a cardboard box or a cartridge for a caulking gun. The size, configuration, and arrangement of the opening or openings 51 in the die block 50 will be varied to provide an extrusion or extrusions of the desired cross-sectional configuration and to suit the particular manner in which the extruded material is being handled and disposed of as it emerges from the die.

In addition to adjusting the spacing of the die block 50 relative to the feed rollers 17 and 18 by means of the set screws 54, the speed of rotation of the feed rollers may also require adjustment to suit the consistency of the plastic material being extruded and the rate at which it is being extruded. Such speed variation may be accomplished in any desired manner, as by merely varying the speed of the motor 25. However, as will be appreciated by those skilled in the art, it may generally be desirable to employ an infinitely variable speed control mechanism (not shown) in a conventional manner between the motor 25 and the driving gear 21 on the roller shaft 19.

It will be apparent from the foregoing that I have provided an extrusion machine of extremely simple design which can be manufactured at low cost and yet possesses the various desirable characteristics hereinbefore described. The amount and severity of working of plastic material being fed through the machine is obviously greatly reduced compared to the auger-type extruders heretofore widely used. As a result, very little heat is developed, cooling of the machine is not required, and the power required to operate the machine is low, thus permitting the use of a small motor as the source of power. Of equal significance is the great flexibility of the machine in its adaptability to handle plastic materials of different consistency and degrees of tackiness merely by adjusting the spacing of the die block 50 from the feed rollers 17 and 18 and adjusting the speed to rotation of the feed rollers.

Reference has been made above to a pair of parallel edges 52 on the die block 50 that are adjustably disposed in closely spaced relationship with the feed rollers 17 and 18, respectively. These edges are shown in the drawing as being defined by a pair of die block surfaces that intersect at substantially right angles so that the edges 52 are relatively sharp. It is to be understood, however, that the edges 52 need not be sharp edges and are equally effective for their described purpose if they are elongated, narrow, flat surfaces or are even contoured to conform to the curvature of the feed rollers. The only criterion in this regard is that the edges 52 define uniform small spaces between the die block and the two feed rollers over the entire lengths of the feed rollers between the wall members 27 adjacent opposite ends thereof.

The particular form of the invention shown in the drawing and described above embodies an illustrative scraping device 35 and an illustrative structure for floatingly mounting the die block in position to cooperate with the feed rollers. However, it is particularly to be emphasized that the specific form of scraper device and the specific structure for mounting the die block so that it is urged toward the feed rollers, while being floatingly supported by the plastic material being extruded may be varied widely without departing from the principles of the invention as described and claimed herein. Similarly, various other details of the invention as shown and described, such as the form of the wall structure defining the compartment 16 and the general orientation of the extruding machine, may be varied to suit the character of the material being extruded, the rate at which it is being extruded, and the type of extrusion receiving equipment to be associated with the extruding mechanism, as will be readily appreciated by those skilled in the art. It is intended, therefore, that the following claims shall cover all such modifications as naturally fall within the reasonable scope of the terms thereof.

What is claimed is:

1. An extrusion machine comprising spaced frame members, a pair of parallel, closely spaced feed rollers mounted on said frame members for rotation about their respective axes, means for rotating said rollers in opposite directions about their respective axes for feeding extrusion material through the space therebetween from a low pressure receiving side of the rollers to a high pressure feeding side of the rollers, wall members mounted on said frame members for confining extrusion material therebetween against escape outwardly and axially of the rollers while being fed thereby under pressure into and through a feeding zone adjacent the high pressure side of the rollers, and a die block having at least one extrusion aperture therethrough, said die block engaging and extending between said wall members and having a pair of parallel edges extending axially of the rollers and respectively disposed in close juxtaposition therewith, said die block, said rollers, and said wall means defining and substantially enclosing said feeding zone except for the space between said rollers, and the opening or openings through said die, and the spaces between said parallel edges of the die block and the rollers, respectively, the angles about the rollers subtended by said feeding zone between a plane containing the axes of the rollers and the inner exposed surface of the die block being no greater than about 45°.

2. An extrusion machine according to claim 1, including adjustable means supported from said frame members and engaging said die block for holding the same against the pressure of extrusion material in said feeding zone, said means being adjustable to vary the spacing of said parallel edges of the die block from said rollers, respectively.

3. An extrusion machine according to claim 1, in which said die block is floatingly mounted between said wall members for movement parallel thereto, and adjustable means supported from said frame members and engaging said die block for holding the same against the pressure of extrusion material in said feeding zone, said means being adjustable to vary the spacing of said parallel edges of the die block from said rollers, respectively.

4. An extrusion machine according to claim 1 in which each of said rollers, inwardly of said frame members at each end of the rollers, is provided with a circumferential groove, the grooves of one roller being respectively aligned with the grooves of the other, each of said wall members extending between the rollers from the low pressure to the high pressure side thereof with opposite edges extending into aligned grooves thereof, and scraper means supported on each of said wall members on the low pressure side of the rollers, each of said scraper means including a pair of scraper fingers extending in generally opposite directions away from its supporting wall means and into aligned grooves of said rollers for scraping extrusion material therefrom.

5. An extrusion machine according to claim 1 in which each of said rollers, inwardly of said frame members at each end of the rollers, is provided with a circumferential groove, the grooves of one roller being respectively aligned with the grooves of the other, each of said wall members extending between the rollers from the low pressure to the high pressure side thereof with opposite edges extending into aligned grooves thereof, and scraper means supported on each of said wall members on the low pressure side of the rollers, each of said scraper means including a pair of scraper fingers extending in generally opposite directions away from its supporting wall means and into aligned grooves of said rollers for scraping extrusion material therefrom, and including baffle means for directing extrusion material scraped from said grooves inwardly from its supporting wall member.

References Cited in the file of this patent

UNITED STATES PATENTS

| | | |
|---|---|---|
| 1,752,471 | Trebes | Apr. 1, 1930 |
| 2,154,949 | Lyons | Apr. 18, 1939 |